United States Patent [19]
Napier et al.

[11] 3,781,173
[45] Dec. 25, 1973

[54] METHOD FOR PROVIDING METALLIC CARBIDE COATINGS ON GRAPHITE

[76] Inventors: John M. Napier, 113 Dartmouth Cir.; Anthony J. Caputo, 112 Caldwell Dr., both of Oak Ridge, Tenn. 37830

[22] Filed: Jan. 12, 1971

[21] Appl. No.: 116,703

[52] U.S. Cl............... 117/95, 117/97, 117/106 C, 117/107.2 R, 176/88
[51] Int. Cl....................... C23c 11/08, C23c 13/04
[58] Field of Search................... 117/95, 97, 106 C, 117/107.2

[56] References Cited
UNITED STATES PATENTS

| | | | |
|---|---|---|---|
| 3,501,356 | 3/1970 | Li Chu | 117/106 C X |
| 3,529,988 | 9/1970 | Woerner | 117/106 C X |
| 3,160,517 | 12/1964 | Jenkin | 117/107.2 R X |
| 3,359,098 | 12/1967 | Teaford | 117/107.2 K X |
| 3,464,843 | 9/1969 | Basche | 117/107.2 R X |
| 3,420,707 | 1/1969 | Hanak | 117/107.2 R X |
| 3,366,464 | 1/1968 | Guichet et al. | 117/106 C X |
| 3,421,953 | 1/1969 | McGuire et al. | 117/97 |
| 3,400,016 | 9/1968 | Enstrom et al. | 117/107.2 R X |

OTHER PUBLICATIONS

Powell, Oxley & Blocher, "Vapor Deposition," 1966, pages 307–310 and pages 328–330.

*Primary Examiner*—Carl D. Quarforth
*Assistant Examiner*—Roger S. Gaither
*Attorney*—John A. Horan

[57] ABSTRACT

Metallic or nonmetallic carbide coatings of substantially uniform thickness are provided on internal surfaces of elongated bores within a graphite substrate by vapor deposition. The coating process is achieved by the thermal decomposition of a selected halide and the inter-reaction with a hydrocarbon gas at temperatures of 900°–1200°C. at atmospheric pressure. A temperature gradient along the length of the bore is used to control the coating deposition rate for providing a carbide coating of substantially uniform thickness.

1 Claim, No Drawings

METHOD FOR PROVIDING METALLIC CARBIDE COATINGS ON GRAPHITE

The present invention relates generally to an improved method of coating graphite with a metallic or nonmetallic carbide by vapor deposition, and more particularly to providing bores within a graphite substrate with a metallic carbide coating of substantially uniform thickness. This invention was made in the course of, or under, a contract with the U. S. Atomic Energy Commission.

Graphite is a well known high temperature material which possesses many attractive properties that make it particularly suitable for use as a nuclear reactor fuel matrix material. On the other hand, graphite reacts very vigorously with hot hydrogen gas so as to present a serious drawback when attempting to use graphite as the fuel matrix material for nuclear rocket reactors since the hot hydrogen used as the propellant is heated as it passes through long bores or passageways in the fuel element. In order to overcome this drawback graphite surfaces exposed to the hot hydrogen are clad or coated with a protective carbide coating which effectively inhibits or reduces the hydrogen attack.

Several methods of coating the inside walls of the long bores in the graphite fuel matrix with carbides of niobium, tantalum, silicon, zirconium, tungsten and molybdenum have been considered. Vapor deposition has proven to be the most satisfactory technique for providing continuous adherent coatings even though considerable attention must be exercised to avoid nonuniform coatings. While adjustment of the vapor flow pattern has been found to be a practical approach for uniformly coating exposed surfaces some difficulties are encountered when attempting to coat the inside of elongated small diameter bores. Obtaining a uniformly thick coating presented a considerable problem in that if the coating within the bores was formed in the usual manner by the thermal decomposition or hydrogen reduction of a metal halide-hydrocarbon mixture the coating was somewhat thicker at one end of the bore than at the other. The reason for the coating being of nonuniform thickness is due to the temperature of the substrate which, if at a uniform temperature above the reaction temperature, will cause the deposit to occur primarily at initial points of contact with the substrate and with the coating thickness decreasing with increasing length of the bore.

Previous efforts to provide uniform coatings inside elongated tubes include such techniques as described in U. S. Pat. No. 3,031,338, issued Apr. 24, 1962, which employs a movable heat zone positioned about the tube for heating selected areas of the tube as the heat zone is movd therealong. In U. S. Pat. No. 3,318,724, issued May 9, 1967, there is described a technique for providing uniformly thick tungsten tubing by employing a furnace in which the entire furnace is above the reaction temperature and then selectively and progressively cooled to below the reaction temperature to form the tubing. While previously known techniques such as exemplified by those described in the above patents have demonstrated some success they have some shortcomings which detract from their usefulness in coating internal bores. For example, when employing a movable heating zone the internal coating over the length of the bore is somewhat irregular due to the variations in density of the substrate and the specific mixture employed in the reaction, which frequently varies during the reaction in response to slight differences in temperatures as would occur in the case of a moving heating zone. The use of a heating arrangement wherein a selective and progressive cool-down of the substrate is utilized to produce tungsten tubing cannot be satisfactorily used to coat internal bores since the selective cool-down of the substrate can not be achieved with sufficient rapidity due to the relatively large mass of the substrate so as to provide a uniform coating. If the coating gases are passed over a coated surface at temperatures less than the temerature required to deposit the carbide, the deposited coating will be removed or grossly attacked. Also, if a carbide coating is deposited at a first temperature, e.g., 1,100°C., and a second layer is required, the coating temperature for the second pass must be at least equal to or slightly greater than the original temperature so as to insure that no damage will occur to the original coating. With a movable heating zone several passes would likely be necessary to provide a coating of the desired thickness. Further, since the deposition rate at any temperature in the reaction range is small (about 1 mil per 12 hours is not uncommon), the movable zone heater would have to remain at a particular location for some time during any given pass to get the right thickness. Thus, the overall time required to coat bores 52 inches long would be exceptionally and undesirably long.

It is the principal objective or primary aim of the present invention to provide an improved method for coating the inside of long bores in graphite bodies with a continuous, adherent carbide coating of substantially uniform thickness. The coating is provided by employing a low-temperature, atmospheric-pressure vapor deposition technique in which the selected carbide is deposited onto the heated graphite substrate by the thermal decomposition of a selected halide and the interreaction of the latter with a hydrocarbon gas. The substantial uniformity in the thickness of the coating deposited on the graphite surface portions defining the bores is achieved by using a temperature gradient along the length of the bores ranging from a temperature above that at which thermal decomposition occurs at the entrance to the bores, i.e., the location in the bores initially contacted by the coating vapor, to a substantially higher temperature at the far end of the bores.

Other and further objects of the invention will be obvious upon an understanding of the illustrative method about to be described, or will be indicated in the appended claims, and various advantages not referred to herein will occur to one skilled in the art upon employment of the invention in practice.

Generally, the present invention is directed to a method of providing a carbide coating on the inside surface area of elongated small bores (0.109 inches or less in diameter by 52 inches long) located in graphite-uranium dicarbide rods used as the fuel elements for nuclear rocket reactors. Each rod has 19 bores with a total surface area of 113 inches$^2$ or 16.48 inches$^2$ for each bore. While the present invention primarily relates to the coating of such bores in the aforementioned fuel elements it will appear clear that the subject method can be easily used for coating bores of various diameters and lengths in other metal and nonmetal substrates. Also, while the description below is directed to the formation of niobium carbide and zirconium carbide coatings, it is to be understood that the coatings can be formed of other metallic carbides and nonmetallic carbides without departing from the spirit and scope of the present invention once a person skilled in the art has derived the benefit of the teachings herein. For example, the carbide coatings may be produced from halides selected from the group consisting of niobium halide, tantalum halide, hafnium halide, titanium halide, zirconium halide and silicon halide at temperatures ranging from 900°C. – 1200°C. at atmospheric pressure. The halide may be in either the form of a chloride or bromide but other vaporizable salts such as fluorides, or iodides, may be suitably used.

In order to provide the graphite surface portions or walls defining the bores with a carbide coating of substantially uniform thickness a niobium or zirconium halide is thermally decomposed and then interreacted with a hydrocarbon gas in the presence of hydrogen. The decomposition of the halide and the reaction of resulting metal with the gaseous hydrocarbon occurs contiguous to the graphite substrate when the latter is heated to a temperature at least as great as that required to effect and sustain the thermal decomposition of the selected halide. During the coating operation the halide vapor is contacted with hydrogen and a suitable hydrocarbon gas and then introduced into a furnace or reaction vessel containing the graphite substrate. Preferably, the selected halide is heated in a solid form, e.g., salt, to provide the vapor which is then contacted by a stream of inert gas, e.g., helium or argon, used as a carrier for conveying the vapor into the furnace and for controlling the partial pressure of the reactants during the flow thereof. During the conveyance of the reactants the temperature of the latter is maintained at an elevation sufficient to keep the halide in vapor form. Normally, a temperature of about 300°C. is sufficient for the compounds employed in the present invention. During the flow of the vapor to the furnace a stream of hydrogen and a hydrocarbon gas is co-mingled with the halide vapor-argon mixture. Upon entering the furnace the vapor is introduced into a suitable preheater and manifold system so as to preheat the vapor to the desired reaction temperature before the vapor contacts the substrate and to uniformly distribute the vapor to the plurality of bores in the substrate. The preheater may be heated in the same manner as the substrate as will be discussed below. To aid in the activation of the carburizing reaction between the metal vapor and the hydrocarbon a gas such as HCl may be added to the mixture.

The hydrocarbon gas employed in the coating operation is preferably methane, but other hydrocarbon gases such as $C_2H_2$, $C_2H_4$, and benzene that crack to form $C + H_2$ may be used in place of methane.

The rates at which the halide vapor, argon, methane, HCl, and hydorgen are brought into contact with the graphite substrate and provide satisfactory results may be selected from fairly wide ranges as follows:

| Gas | Velocity in liters/min (l/m)* | |
|---|---|---|
| | NbC | ZrC |
| Argon | 0.24 to 0.48 | 0.13 to 0.24 |
| HCl | 0.04 to 0.08 | |
| Methane | 0.001 to 0.002 | 0.001 to 0.002 |
| Hydrogen | 0.004 to 0.008 | 0.004 to 0.12 |
| NbCl₅ salt | 0.004 to 0.008 | |
| ZrCl₄ salt | | 0.003 to 0.004 |

*Liters/min/element bore (~0.109 in. diameter × 52 in. long).

The flow rates or quantity of argon used to form the coating mixture is not particularly critical and may vary slightly from the aforementioned ranges. The flow rates of the methane and hydrogen control the properties of the carbide coating and the deposition rate, respectively. The hydrogen is used to regulate the rate of reaction between the methane and the metal vapor. A hydrogen-to-NbCl₅ ratio of about 3 to 1 is about maximum while a hydrogen-to-ZrCl₄ ratio of up to 40 to 1 may be used without experiencing difficulty.

The coating operation is carried out at atmospheric pressure which is advantageous because of the difficulties encountered in coating bores of the length described herein by employing known vacuum techniques. Also, the equipment required for vacuum operation is subject to air inleakage which will prevent or inhibit the formation of carbide coating due to formation of oxides.

The surface temperature of the graphite substrate is critical to the control of the deposition rate and the coating thickness of the carbide coatings within the bore. The graphite substrate is heated in such a manner as to form a temperature gradient along the length of the graphite bores whereby the temperature increases with distance from the ends of the bores where the reactant vapors enter. Since the deposition rate is a function of temperature and gas composition the uniformity of the coating is controlled by providing a selected temperature gradient along the elongated bore and employing a constant gas composition at the inlet of the bore. The temperature profiles along the length of the bore being coated are set forth in Table 1 shown below. This table is representative of niobium and zirconium carbide coatings but the temperature profiles obtained from the other carbides are easily achieved by experimentation.

TABLE 1

| Point of Measurement (distance from end of the bore initially contacted by the coating vapor) | Temperature | |
|---|---|---|
| | NbC | ZrC |
| 3 inches | 1040°C | 1055°C |
| 29 inches | 1095°C | 1140°C |
| 43 inches | 1120°C | 1175°C |
| 55 inches* | 1145°C | 1200°C |

*Measurement made in the gas exit chamber 3 in. downstream from end of the bore.

The temperatures utilized in the coating operation are in a range from 900° to 1,200°C. with the maximum controllable temperature for reaction of the present invention being 1,200°C. since above this temperature the deposition rate is exceptionally fast and virtually all of the methane is stripped from the gas stream. While the methane content may be increased to slow down this stripping action the metallic carbide thickness along the length of the substrate becomes much more difficult to control because of the higher hydrocarbon content. The temperature profiles set forth for the carbides in Table 1 are near optimum temperature gradients from the reactant gas formulations described above and may not vary more than ±10°C. at each of the noted control points without excessively detracting from the uniformity of the coating.

The heating of the graphite substrate to provide the desired temperature gradient along the length of the bores may be accomplished by encircling the substrate with a plurality of induction heating coils axially spaced apart along the length of the bore with each coil providing preselected substrate temperatures at desired locations. However, any suitable commercially available heating system capable of providing the necessary temperature gradient along the length of the bore in the substrate may be used.

In order to provide a more facile understanding of the method of the present invention examples of typical niobium carbide and zirconium carbide coating operations are set forth below. In these examples the carbide coatings were provided on the walls of bores through a graphite substrate with the bores each having a diameter of approximately 0.109 inch and a length of 52 inches. Also, the bracketed figures relate to volume percent provided by each ingredient of the coating mixture.

EXAMPLE I

A niobium carbide coating was formed at atmospheric pressure on the walls of the bores in the graphite substrate by vaporizing $NbCl_5$ salt (1.62 percent) by heating it to a temperature of 300°C. in a vaporizer; passing argon over the salt to eject the $NbCl_5$ vapors from the vaporizer into a conduit heated to 300°C.; introducing into the conduit a metered gaseous mixture of argon (total argon content 82.72 percent), hydrogen (1.51 percent), HCl (13.78 percent), and methane (0.37 percent); conveying the reactant vapor by means of the flowing argon into the reaction vessel where the vapor was preheated to 1,040°C. and then brought into contact with the graphite substrate heated to temperatures of 1,040°C., 1,095°C., 1120°C., and 1145°C. at distances or locations of 3 inches, 29 inches, 43 inches and 55 inches (last temperature point is located in gas exit chamber, 3 inches from end of substrate), respectively, from the end of the substrate initially contacted by the vapor; maintaining the reactant flow and substrate temperature for a duration of 21 hours during which the thermal decomposition of the $NbCl_5$ vapor and the inter-reaction of the resulting metal and methane occurred to provide a niobium carbide coating of thicknesses set forth in Table 2 below.

TABLE 2

| Point of Measurement (inches from end) | Thickness of Coating (mils) | |
|---|---|---|
| | NbC | ZrC |
| 2.5 | 1.40 | 1.30 |
| 7.5 | 1.65 | 1.65 |
| 12.5 | 1.65 | 1.95 |
| 17.5 | 1.60 | 2.15 |
| 22.5 | 1.60 | 2.20 |
| 27.5 | 1.60 | 2.25 |
| 32.5 | 1.60 | 2.25 |
| 37.5 | 1.80 | 2.35 |
| 42.5 | 1.85 | 2.55 |
| 47.5 | 1.80 | 2.85 |

EXAMPLE II

A zirconium carbide coating was provided on another graphite substrate by employing the procedure set forth in Example I and a reactant vapor of argon (95.74 percent), vaporized $ZrCl_4$ (1.91 percent), methane (0.43 percent), and hydrogen (1.91 percent). The temperature profile used was 1,055°C., 1,140°C., 1.175°C., and 1,200°C. at locations along the bore corresponding to those set forth in Example I. The reactant flow and substrate temperature was maintained for 50 hours and provided a zirconium carbide coating of thicknesses set forth in Table 2 above.

It will be seen that the present invention provides a desirable approach to providing carbide coatings on complex substrates and is particularly suitable for coating passageways or bores through graphite articles since the tempratures and pressures are easily attained without the exercise of time-consuming and complex mechanisms.

What is claimed is:

1. A method of providing a niobium carbide or zirconium carbide coating of substantially uniform thickness on surface portions of a graphite substrate that define at least one elongated passageway extending through the substrate, comprising the steps of contacting said surface portions of the graphite substrate with a gaseous mixture of a volatile halide selected from the group consisting of niobium pentachloride and zirconium tetrachloride, argon, hydrogen, hydrogen chloride when the volatile halide is niobium pentachloride, and methane, and heating the substrate to provide an increasing gradient of temperatures from a location on said surface portions initially contacted by the gaseous mixture to another location on said surface portions at the opposite end of said at least one passageway with said gradient of temperatures being in a range of 900°C. to 1,200°C. for thermally decomposing the volatile halide and effecting a reaction of the decomposed halide with the hydrogen and methane for depositing the carbide coating on said surface portions, said gradient of temperatures providing sufficient temperature increases from the first mentioned location through said another location to effect a substantially uniform deposition rate of said coating on the surface portions defining said at least one passageway, said gaseous mixture being at atmospheric pressure with each gas in the mixture when the volatile halide is niobium pentachloride having a flow rate in the range of 0.004 to 0.008 l/m for the niobium pentachloride, 0.001 to 0.002 l/m for the methane, 0.004 to 0.008 l/m for the hydrogen, 0.24 to 0.48 l/m for the argon, and 0.004 to 0.008 l/m for the hydrogen chloride, and when the volatile halide is zirconium tetrachloride each gas in the mixture having a flow rate in the range of 0.003 to 0.004 l/m for the zirconium tetrachloride, 0.001 to 0.002 l/m for the methane, 0.004 to 0.12 l/m for the hydrogen, and 0.13 to 0.24 l/m for the argon.

* * * * *

UNITED STATES PATENT OFFICE
CERTIFICATE OF CORRECTION

Patent No. 3,781,173    Dated December 25, 1973

Inventor(s) J. M. Napier, and A. J. Caputo

It is certified that error appears in the above-identified patent and that said Letters Patent are hereby corrected as shown below:

after [76] add:

--[73] Assignee: The United States of America as represented by the United States Atomic Energy Commission Signed and sealed this 21st day of May 1974.

(SEAL)
Attest:

EDWARD M. FLETCHER, JR.
Attesting Officer

C. MARSHALL DANN
Commissioner of Patents